(12) United States Patent
Dageforde

(10) Patent No.: US 11,667,032 B2
(45) Date of Patent: Jun. 6, 2023

(54) PROCESSING DEVICE

(71) Applicant: FESTOOL GMBH, Wendlingen (DE)

(72) Inventor: Jonas Dageforde, Esslingen (DE)

(73) Assignee: FESTOOL GMBH, Wendlingen (DE)

( * ) Notice: Subject to any disclaimer, the term of this patent is extended or adjusted under 35 U.S.C. 154(b) by 286 days.

(21) Appl. No.: 16/961,950

(22) PCT Filed: Dec. 4, 2018

(86) PCT No.: PCT/EP2018/083520
§ 371 (c)(1),
(2) Date: Jul. 14, 2020

(87) PCT Pub. No.: WO2019/137695
PCT Pub. Date: Jul. 18, 2019

(65) Prior Publication Data
US 2020/0384641 A1     Dec. 10, 2020

(30) Foreign Application Priority Data
Jan. 15, 2018   (DE) .......................... 102018200551.6

(51) Int. Cl.
*B25J 9/16*    (2006.01)
*B25J 9/10*    (2006.01)

(52) U.S. Cl.
CPC .......... *B25J 9/1633* (2013.01); *B25J 9/1015* (2013.01); *B25J 9/1615* (2013.01); *B25J 9/1692* (2013.01)

(58) Field of Classification Search
CPC ....... B23Q 1/445; B25J 9/1015; B25J 9/1615; B25J 9/1633; B25J 9/1692
See application file for complete search history.

(56) References Cited

U.S. PATENT DOCUMENTS

2010/0146802 A1*  6/2010  Ehlerding .............. B23Q 1/445
                                              33/503
2010/0175490 A1*  7/2010  Satou ..................... B23Q 1/601
                                              74/89.23

(Continued)

FOREIGN PATENT DOCUMENTS

DE        2854856 A1    12/1978
DE       10230021 C1     7/2003
(Continued)

OTHER PUBLICATIONS

International Search Report in corresponding PCT Application No. PCT/EP2018/083520, dated Mar. 8, 2019.
(Continued)

*Primary Examiner* — Dale Moyer
(74) *Attorney, Agent, or Firm* — Hamre, Schumann, Mueller & Larson, P.C.

(57) ABSTRACT

A processing device with a processing head including a processing unit designed as a tool and/or applicator unit, in particular a printer unit, and a first positioning device for moving the processing head in order to position the processing unit with a first accuracy at a specified processing position. The processing head has a second positioning device and the processing device is adapted to position the processing unit at the specified processing position with a second accuracy using the second positioning device, the second accuracy being higher than the first accuracy, so that the lower accuracy of the first positioning device is compensated for by the positioning with the second positioning device.

17 Claims, 4 Drawing Sheets

(56) References Cited

U.S. PATENT DOCUMENTS

2018/0283017 A1* 10/2018 Telleria ................ B05D 3/0413
2020/0230814 A1* 7/2020 Sehrschoen ............ B25J 9/1633

FOREIGN PATENT DOCUMENTS

| DE | 102006049627 A1 | 4/2008 |
| DE | 102011006679 A1 | 9/2012 |
| JP | H07128467 A | 11/1993 |
| WO | 2015087411 A1 | 6/2015 |

OTHER PUBLICATIONS

Written Opinion in corresponding PCT Application No. PCT/EP2018/083520, dated Mar. 8, 2019.
German Search Report in corresponding German Application No. 102018200551.6, dated Aug. 20, 2018.

* cited by examiner

PROCESSING DEVICE

The invention relates to a processing device with a processing head comprising a processing unit designed as a tool and/or applicator unit, in particular a printer unit. The processing device has a first positioning device for moving the processing head in order to position the processing unit with a first accuracy at a specified processing position.

BACKGROUND OF THE INVENTION

Conventionally, as processing devices especially CNC machines are used, which have a positioning device with several machine axes in order to position a processing unit, especially a tool, at a specified processing position. The accuracy with which the processing unit can be positioned depends on the accuracy of the positioning device. The accuracy of the positioning is also referred to as positioning accuracy in the following.

Furthermore, the size of the processing area of the processing device, i.e. the positioning area in which the processing unit can be positioned for processing, depends on the positioning device—in particular on the maximum deflection of the machine axes of the positioning device.

Generally, there is both the need to be able to position the processing unit with a high accuracy and the need to have a large processing area available in which the processing unit can be positioned for processing. However, as the positioning area of the positioning device increases, it becomes more and more difficult to guarantee a high accuracy.

SUMMARY OF THE INVENTION

It is an object of the invention to provide a processing device in which a high positioning accuracy can be achieved as independently as possible of the size of the positioning area of the positioning device.

The object is solved by the appended claims. According to the invention, the processing head of the processing device mentioned above has a second positioning device and the processing device is designed to position the processing unit at the specified processing position with a second accuracy using the second positioning device. The second accuracy is higher than the first accuracy, so that the lower accuracy of the first positioning device is compensated by the positioning with the second positioning device.

Because the second positioning device compensates for the lower accuracy of the first positioning device, the positioning accuracy of the processing device is now primarily ensured by the second positioning device. The first positioning device can thus be designed for lower accuracy—and thus also without difficulty for a larger positioning area—without impairing the positioning accuracy of the processing device as a whole.

The second positioning device itself does not require a large positioning area, as it is part of the processing head that can be positioned with the first positioning device and is moved or positioned together with the processing head, thus effectively using the positioning area of the first positioning device. The positioning area of the second positioning device must ultimately only be so large that the maximum possible deviation between the processing unit and the specified processing position resulting from the low accuracy of the first positioning device can be compensated for. Since the second positioning device only has to provide a relatively small positioning area, the second positioning device can easily be implemented with a high positioning accuracy.

The combination of the first positioning device and the second positioning device according to the invention thus has the advantage that the processing device can have a high positioning accuracy overall, even if the first positioning device has a lower positioning accuracy due to a large positioning area to be provided.

The difference in positioning accuracy between the first positioning device and the second positioning device can result, for example, from the fact that the positioning devices, in particular the machine axes of the positioning devices, have different stiffnesses against reaction forces and/or different movement precision in the control of the positioning devices. Furthermore, it is also possible that the difference in accuracy is due to the fact that the first positioning device is operated by an open-loop control, whereas the second positioning device is operated by a closed-loop control.

The term "accuracy" or "positional accuracy" shall refer in particular to a (statistical) mean deviation and/or a maximum deviation between the position of the processing unit and the specified processing position. A greater accuracy means a smaller deviation, and a smaller accuracy means a greater deviation.

Advantageous further embodiments are defined in the dependent claims.

BRIEF DESCRIPTION OF THE DRAWINGS

Further details as well as exemplary embodiments are explained below with reference to the drawing.

DETAILED DESCRIPTION OF THE INVENTION

Figure 1:
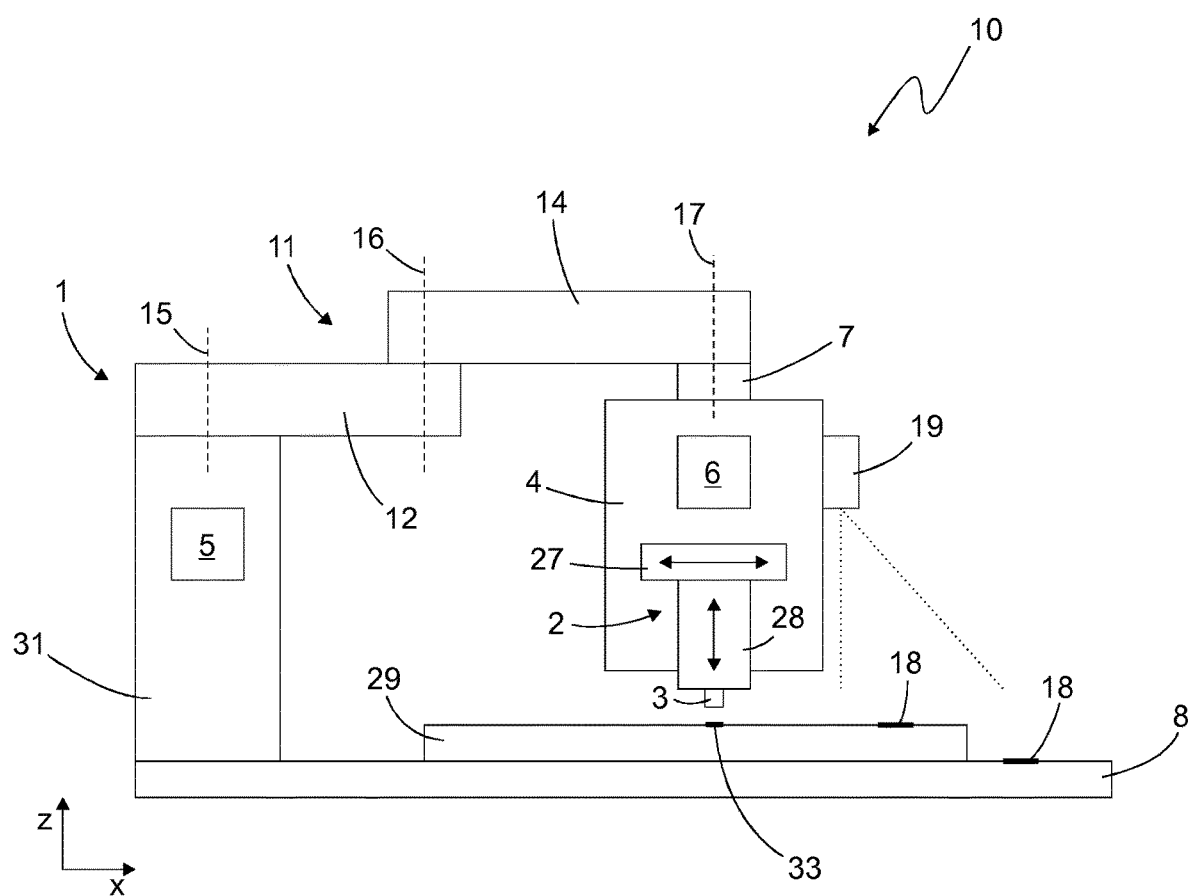
FIG. 1 shows a schematic representation of a processing device according to a first embodiment in a side view, FIG. 2 a schematic representation of the processing device according to the first embodiment in a top view, FIG. 3 a schematic representation of a processing device according to a second embodiment in a side view, FIG. 4 a schematic representation of the processing device according to the second embodiment in a top view.
Figure 2:
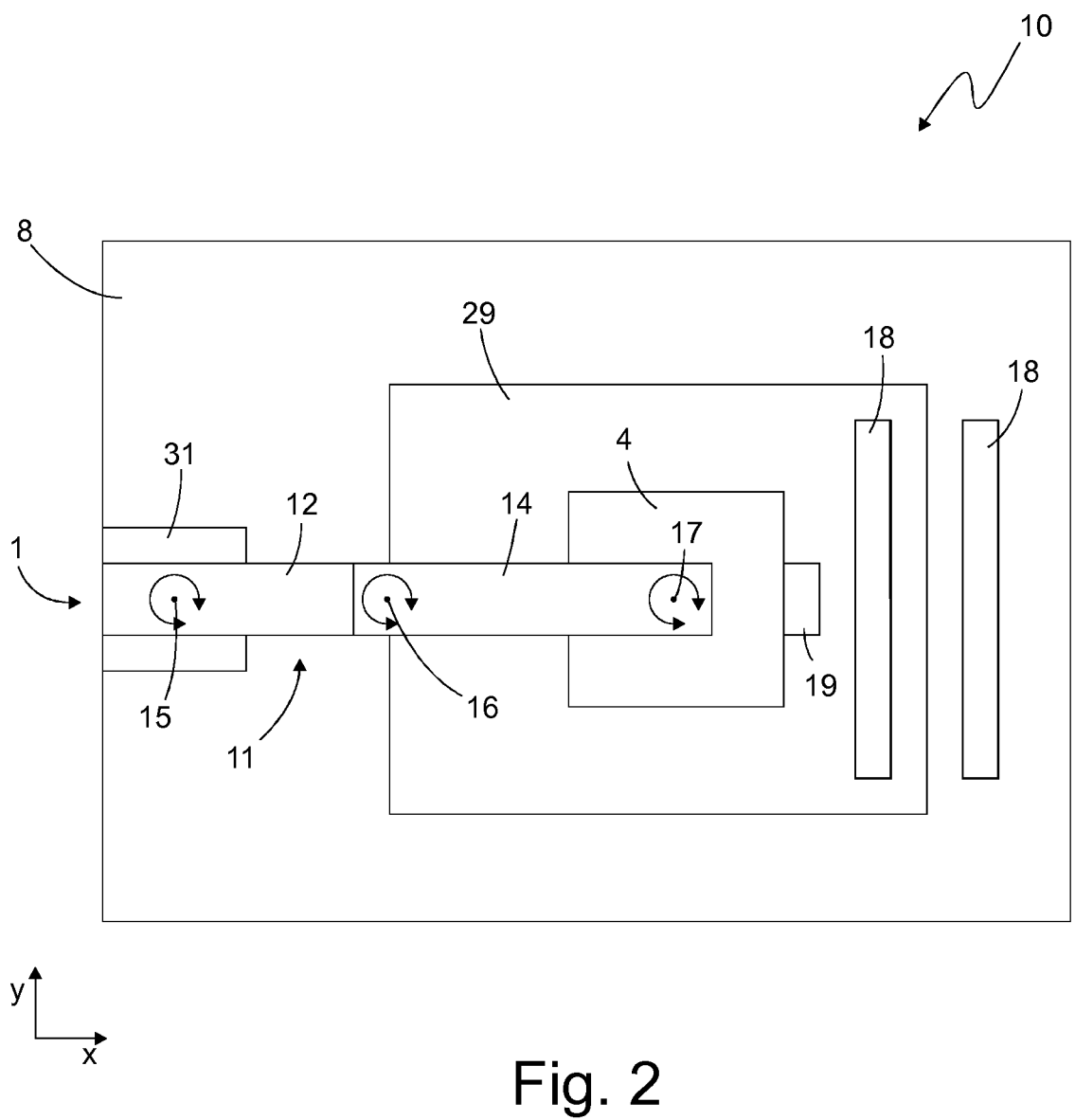
Figure 3:
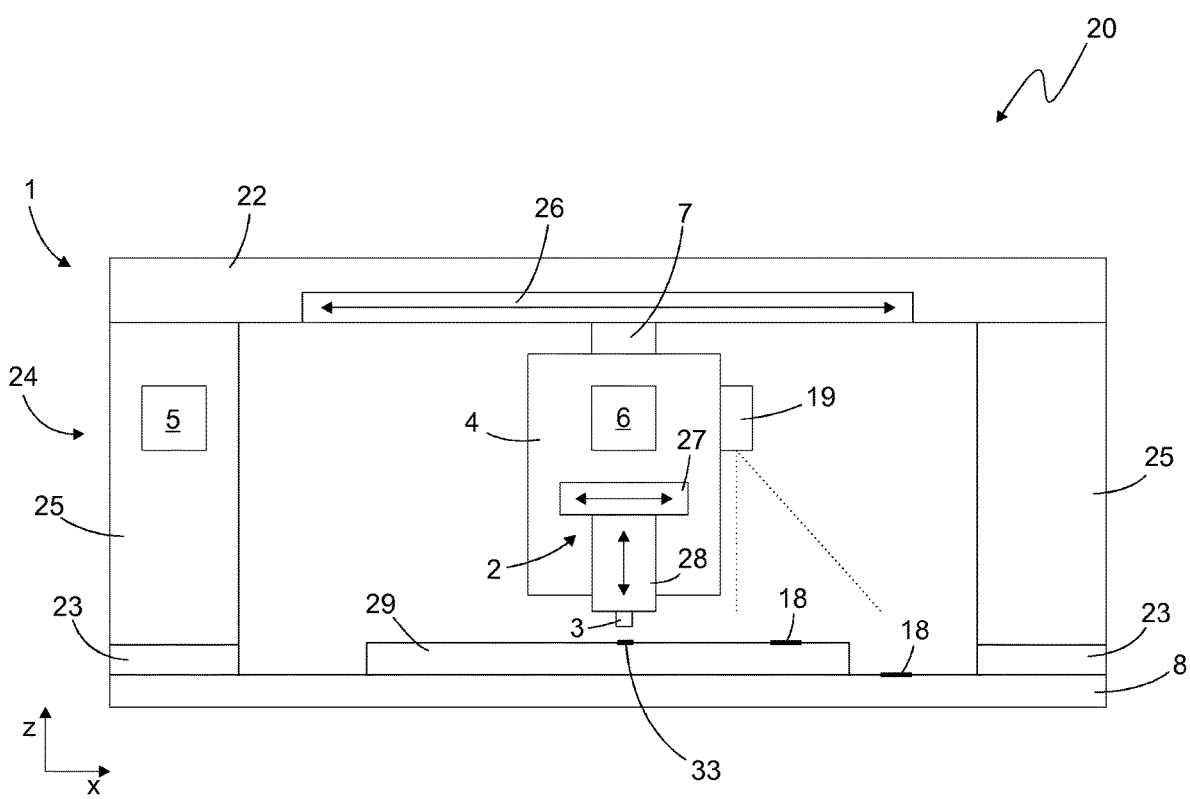
Figure 4:
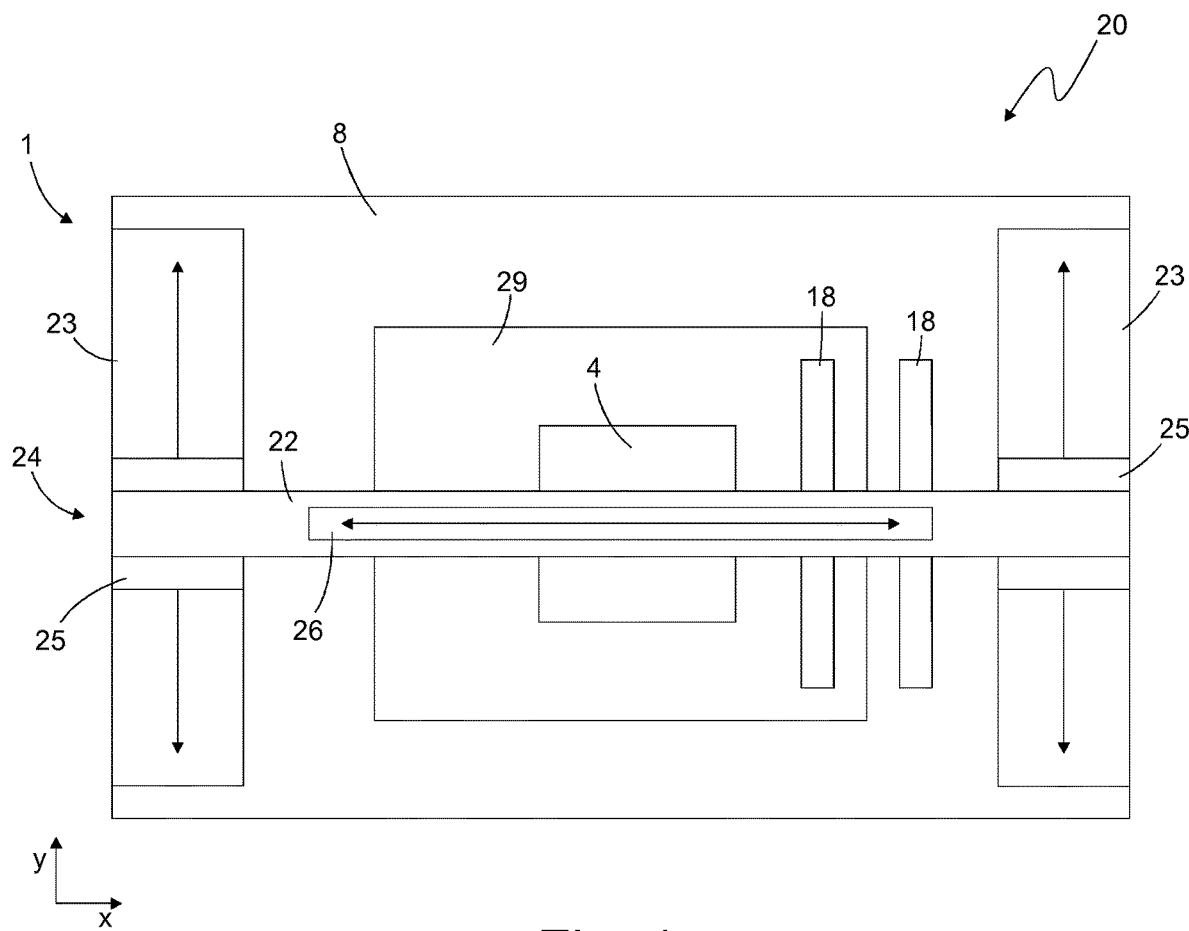

FIGS. 1 and 2 show a processing device 10 according to a first embodiment, while FIGS. 3 and 4 show a processing device 20 according to a second embodiment. As an example, the first positioning device 1 is designed as a scara robot in the first embodiment and as a gantry robot in the second embodiment. In the following, those features that are present in both the first embodiment and the second embodiment shall be discussed first. For the sake of simplicity, the processing device 10 will be referred to primarily; the explanations also apply accordingly to the processing device 20.

The processing device 10 comprises a processing head 4, which has a processing unit 3. The processing unit 3 is designed as a tool and/or applicator unit, in particular as a printer unit.

The processing device 10 further comprises a first positioning device 1 for moving the processing head 4 in order to position the processing unit 3 with a first accuracy at a specified processing position 33.

The processing head 4 comprises a second positioning device 2 The processing device 10 is configured to use the second positioning device 2 to position the processing unit 3 at the specified processing position 33 with a second accuracy.

The second accuracy is higher than the first accuracy, so that the positioning with the second positioning device 2 compensates for the lower accuracy of the first positioning device 1. In particular, the positioning with the second positioning device 2 can correct the positioning error—i.e. the deviation between the position of the processing unit 3 and the specified processing position 33—caused by the positioning with the first positioning device 1.

In this way, a high accuracy can be achieved overall without the first positioning device 1, which positions the processing head 4—and thus usually has the larger positioning area—having to provide this high accuracy. Consequently, in particular a positioning device with a large positioning area can be used as the first positioning device 1 without impairing the overall positioning accuracy of the processing device 10.

In the following, exemplary details of the processing devices 10 and 20 and their components are explained. For the sake of simplicity, here too, the processing device 10 is primarily referred to, whereby the explanations also apply to the processing device 20.

The first positioning device 1 serves to move the processing head 4 relative to a static part of the processing device 10, for example a workplace support 8, and/or relative to a workplace 29.

The first positioning device 1 has exemplarily a first degree of freedom x and a second degree of freedom y for positioning the processing unit 3. Exemplarily, the degrees of freedom x, y of the first positioning device 1 are linear degrees of freedom, especially coordinates of a cartesian coordinate system. A positioning plane is preferably defined by the two degrees of freedom x, y. With the first positioning device 1, the processing head 4 and/or the processing unit 3 can be positioned in the positioning plane defined by the degrees of freedom x, y.

As an example, the processing device 10 has the workplace support 8, on which the workplace 29 is expediently located. The upper side of the workplace support 8 and/or the upper side of the workplace 29 is in particular aligned parallel to the positioning plane and lies in particular in or represents the positioning plane.

The first positioning device 1 can further be configured to move the processing head 4 in z-direction—i.e. orthogonal to the x-direction and y-direction. The first positioning device 1 can thus be configured in particular to guide the processing head 4 in three-dimensional space.

The first positioning device 1 has several machine axes, in particular one or more linear machine axes and/or one or more rotary axes.

The processing device 10 is in particular configured to position the processing unit 3 using the first positioning device 1 in an area within which a deviation from the specified processing position 33 can be corrected using the second positioning device 2. This area, in which a correction with the second positioning device is possible, can also be called the processing window. Expediently, the processing device 10 is configured to detect when processing unit 3 leaves the processing window and, in this case, to interrupt or pause the processing by the processing unit 3.

In FIGS. 1 and 2, the first positioning device 1 is exemplarily designed as a scara robot. Accordingly, the first positioning device 1 comprises a robot base 31, on which a robot arm 11 is provided. As an example, the processing head 4 is attached or suspended at a distal end of the robot arm 11. By means of the robot arm 11, the processing head 4 can be moved relative to the robot base 31.

The robot arm 11 has a first robot member 12 and a second robot member 14, but it is also possible for the robot arm 11 to have further robot members. Preferably, the processing head 4 is attached to the last robot member—here the second robot member 14.

The first robot member 12 is connected to the robot base 31 via a first machine axis 15 and can be driven relative to the robot base 31 via this first machine axis 15. The second robot member 14 is connected to the first robot member 12 via a second machine axis 16 and can be driven relative to the first robot member 12 via this second machine axis 16. The processing head 4 is connected to the second robot member 14 via a third machine axis 17 and can be driven relative to the second robot member 14 via this third machine axis 17. As an example, the second robot member 14 has a mechanical interface 7, to which the processing head 4 is attached, in particular detachably. The first machine axis 15 and the second machine axis 16 permit rotary movements, while the third machine axis 17 permits rotary and linear movements. Overall, a positioning device 1 designed in this way can position the processing head 4 in the x-direction, y-direction and z-direction.

The robot base 31 is mechanically connected to the workplace support 8; as an example, the robot base 31 is arranged on the workplace support 8 and extends upwards in the z direction. The robot arm 11 extends essentially horizontally from the robot base 31 and projects over the x-y area of the workplace support 8. The processing head 4 is suspended from the robot arm 11 and extends correspondingly in the z direction downwards to the workplace support 8 or workplace 29.

In FIGS. 3 and 4 the first positioning device 1 is exemplarily designed as a gantry robot. Accordingly, the first positioning device 1 comprises a gantry slide 24 which can be driven relative to the workplace support 8 or relative to the workplace 29. As an example, the gantry slide 24 can be moved in the y-direction relative to the workplace support 8 or relative to the workplace 29. A first linear drive 23 is provided to drive the gantry slide 24. The gantry slide 24 has a gantry arm 22, on which the processing head 4 is suspended so that it can be moved in the x-direction in particular. To drive the processing head 4, especially in the x-direction, relative to the gantry arm 22, a second linear drive 26 is provided on the gantry arm 22. A mechanical interface 7 is provided on the gantry arm 22, to which the processing head 4 is attached, in particular detachably. Overall, the positioning device 1, designed as a gantry robot, can position the processing head 4 in the x-direction and y-direction. Optionally, the positioning device 1 can also be designed to position the processing head in the z-direction.

In the embodiment shown, the gantry slide 24 has two vertical elements 25, which extend upwards in the z-direction from the workplace support 8. The gantry arm 22 extends from one vertical element 25 to the other vertical element 25 and, together with the vertical elements 25, forms the gantry slide 24.

The first positioning device 1 is not limited to the designs discussed above as a scara robot or gantry robot. Instead, the first positioning device 1 can also be designed as another robot device. The first positioning device 1 can be designed as an articulated arm robot, a robot with linear axes, a rail vehicle, a device moving on a workplace, and/or a pulling system with ropes and/or chains. Expediently, the positioning device 1 is an industrial robot.

The processing device 10 is exemplarily configured to compensate for the lower accuracy of the first positioning device 1 in the first degree of freedom x and/or the second degree of freedom y by using the second positioning device 2.

Expediently, the second positioning device 2 has the same degree of freedom x and/or the same degree of freedom y as the first positioning device 1. In particular, the second positioning device 2 can correct a positioning error caused by the lower accuracy of the first positioning device 1—i.e. a deviation of the processing unit 3 from the specified processing position 33 in x-direction and/or y-direction. Expediently, the second positioning device 2 has one, several or all degrees of freedom of the first positioning device 1.

As exemplarily shown in FIGS. 1 and 3, the second positioning device 2 preferably has an xy drive 27, for example a positioning platform, with which the processing unit 3 can be positioned relative to the processing head 4 in the x-direction and in the y-direction. Optionally, the positioning device 2 also has a z-drive 28, with which the processing unit 3 can be positioned relative to the processing head 4 in the z-direction. The second positioning device 2 is preferably integrated in or attached to the processing head 4.

The area, especially the x-y area, in which the first positioning device 1 can position the processing unit 3, shall also to be referred to as the first positioning area. The area, in particular the x-y area, in which the second positioning device 2 can position the processing unit 3, shall also be referred to as the second positioning area. Expediently, the first positioning area is larger than the second positioning area. For example, the first positioning area is at least twice, in particular at least 10 times, expediently at least 50 times or 100 times as large as the second positioning area. Preferably the first positioning device 1 and the second positioning device 2 are designed in such a way that the first positioning area and the second positioning area always overlap.

The second positioning device 2 is s in particular in such a way that the positioning of the processing unit 3 by the second positioning device 2 is carried out with a higher accuracy and/or speed and/or rigidity than the positioning of the processing unit 3 with the first positioning device 1.

The processing head 4 can, for example, be designed as a hand-guided processing device so that the processing head 4 can be positioned manually at the specified processing position 33, in particular in a state removed from the first positioning device 1 or the processing device 10. The processing head 4 is designed in particular to position the processing unit 3 at the specified processing position 33 with the second accuracy using the second positioning device 2, so that a lower accuracy of the manual positioning is compensated for by the positioning with the second positioning device 2. Expediently, the processing head 4 may be handled as a stand-alone processing unit and used for processing the workplace 29.

The processing unit 3, designed as a tool, expediently comprises a router, a saw, in particular a circular saw and/or jigsaw, a laser, a punching device, a cutting tool, in particular a textile and/or leather cutter, and/or a water jet. If the processing unit 3 is designed as an applicator unit, it comprises in particular a printing unit, preferably a 3D printing unit.

As an example, the processing device 10, in particular the first positioning device 1, has a mechanical interface 7 to which the processing head 4 and/or the processing unit 3 is detachably attached. The mechanical interface 7 can be designed in particular as a change device which allows the processing head 4 and/or processing unit 3 to be changed.

Alternatively, the processing head 4—and thus in particular the second positioning device 2—can be fixedly connected to the first positioning device 1.

The processing device 10, in particular the first positioning device 1, may further have a lifting means, in particular a gripper and/or a vacuum suction device, for handling the processing head 4, the processing unit 3 and/or a workplace 29. The lifting device may expediently be the mechanical interface 7 mentioned above. Expediently, the same lifting device may be used to attach the processing head 4 to the first positioning device 1 during the processing and to move the workplace 29 into or out of the processing area of the processing device 10 before and/or after the processing. Expediently, the processing device 10 is configured to position the workplace 29 on the workplace support 8 with the aid of the lifting means.

Expediently, the processing device 10 includes a changing magazine for holding at least one further processing head and/or at least one further processing unit. For example, the processing device 10 has at least two different processing heads and/or two different processing units and is configured to replace the processing head 4 and/or the processing unit 3 attached to the first positioning device 1 with another processing head and/or another processing unit using the changing magazine.

The processing device 10 is exemplarily configured to determine the position of the processing unit 3 relative to the specified processing position 33 and to carry out the positioning of processing unit 3 using the first positioning device and/or the second positioning device 2 based on the determined position of processing unit 3. For example, the processing device 10 is configured to detect the processing unit 3 and/or the workplace 29 in particular by means of a video and/or image recording, a laser scan and/or by means of ultrasound and to calculate the current position of the processing unit 3 on the basis of a position determination algorithm. On the basis of the calculated position, the further positioning or correction of the positioning can then be carried out with one or both of the positioning devices 1, 2, in particular with the second positioning device 2.

In particular, the processing device 10 is configured to detect the processing unit 3 and/or the workplace 29 by means of video and/or image recognition/processing and/or by scanning the workplace and/or by evaluating ultrasound. Furthermore, the processing device 10 can be configured to determine the position of the workplace 29 and/or the processing unit 3 by using other position sensors and/or algorithms on the basis of sensor data (for example video, images, laser, ultrasound). Sensors required for this can be arranged and/or attached to the positioning devices 1, 2, the processing head 4 and/or stationary.

The processing device 10 has, for example, a sensor unit 19, for example an image sensor, which is located in particular on the processing head 4. The sensor unit 19 is configured to detect a reference element 18 present on the processing device 10 and/or the workplace 29. The reference element 18 is for example an optical marking, in particular a piece of tape, preferably a piece of adhesive tape, with a printed pattern.

According to an configuration not shown, the reference element 18 can also be provided only on the processing device 10, for example on the workplace support 8, and thus in particular not on the workplace 29.

Furthermore, features of the workplace 29, e.g. edges can serve as the reference element 18. Furthermore, foils and/or markers applied to the workplace 29, markings applied to the workplace support 8 next to and/or above the workplace 29 or markings positioned in the positioning area of the first positioning device 1 or the processing device 10 (e.g. by means of stands), in particular circular markers and/or rulers, can serve as the reference element 18. A ruler positioned next to and/or on the workplace 29 can be used as the reference element 18.

As an alternative or in addition to the above-mentioned design as an image sensor, the sensor unit 19 may also include other position sensors, in particular an acceleration sensor, a laser sensor and/or an ultrasonic sensor. For determining the position by means of laser and/or ultrasonic, a laser and/or ultrasonic source can be provided on the processing device 10, in particular on the processing head 4.

The processing device 10 is configured to determine the position of the processing unit 3 relative to the specified processing position 33 using the sensor unit 19.

Expediently, the processing device 10 has a stored reference map in which the position of the reference element 18 is indicated. The processing device 10 is configured to determine the position of the processing unit 3, in particular relative to the specified processing position 33, using the reference map and the reference element 18 detected by the sensor unit 19. For example, as mentioned above, the sensor unit 19 is an image sensor and the reference element 18 is an optical marking. The processing device 10 is particular configured to detect the reference element 18 in an image taken by the sensor unit 19 using image processing software, for example using a machine vision algorithm, and to calculate a relative position of the sensor unit 19 or the processing unit 3 to the reference element 18 based on the detected reference element 18. Since the position of the reference element 18 in the reference map is known, the position of the processing unit 3 in the reference map can thus be determined.

In this way, a deviation of the position of the processing unit 3 from the specified processing position 33 can be determined, which deviation can be used for positioning with the second positioning device 2 to compensate for this deviation.

Preferably the processing device 10 is configured to create the reference map as part of an initialization process. For this purpose, the processing device 10 is configured, for example, to move the processing head 4 using the first positioning device 1 in order to detect the processing area of the processing device 10 with the sensor unit 19, in particular to record image data thereof. The processing device 10 is in particular configured to create the reference map based on the detected processing area, in particular on the basis of the recorded image data.

Expediently, the discussed position determination of the processing unit 3 is used only for positioning with the second positioning device 2—i.e. in particular not for positioning with the first positioning device 1.

Accordingly, positioning with the first positioning device 1 can be an open-loop control—i.e. not a closed-loop control. The processing device 10 is therefore in particular configured to carry out the positioning with the first positioning device 1 via an open-loop control. This may mean, for example, that for positioning with the first positioning device 1, no feedback variable about the position of the processing head 4 or processing unit 3 is used.

Positioning with the second positioning device 2, on the other hand, is preferably carried out as closed-loop control. Expediently, the processing device 10 is configured to carry out the positioning with the second positioning device 2 via a closed-loop control. In particular, the processing device 10 is configured to closed-loop control the position of the processing unit 3 to the specified processing position 33. For this purpose, the processing device 10 can use a feedback variable about the position of the processing head 4 or the processing unit 3 when positioning with the second positioning device 2, for example the position of the processing unit 3 detected by means of the sensor unit 19.

The processing device 10 has one or more control units, in particular computer units such as microcontrollers, in order to carry out the above-discussed determination of the position of the processing unit 3 and/or a control of the processing unit 3 and/or a control of positioning devices 1, 2. The control of the positioning devices 1, 2 is carried out in particular on the basis of processing data, which is provided, for example, as design/CAD data.

In a configuration not shown, the processing device 10 has a control unit, for example a microcontroller, which controls both the first positioning device 1 and the second positioning device 2. Expediently, the control unit carries out a coordination between the two positioning devices 1, 2. Furthermore, this control unit can also be configured for control or communication with the processing unit 3 and/or the sensor unit 19.

In the embodiments shown, the processing device 10 comprises a separate control unit for each positioning device 1, 2. The processing device 10, for example, has a first control unit 5 for controlling the first positioning device 1 and a second control unit 6 for controlling the second positioning device 2. The second control unit 6 is part of the processing head 4.

Preferably, the first control unit 5 does not control the second positioning device 2 and the second control unit 6 preferably does not control the first positioning device 1. Each control unit 5, 6 is preferably only responsible for one positioning device.

Preferably, the first control unit 5 and/or the second control unit 6 is configured to control the processing unit 3, for example to effect processing of the workplace 29.

Expediently, the first control unit 5 and/or the second control unit 6 is connected to the first positioning device 1, the second positioning device 2, the processing unit 3 and/or the sensor unit 19 via wired and/or wireless data connections.

Processing data, which in particular indicates the aforementioned processing position 33, is expediently provided in both control units 5, 6, so that each of the control units 5, 6 can carry out the control of the respectively assigned positioning device 1, 2 on the basis of the processing data.

The control units 5, 6 can be designed differently so that they accept and/or require the processing data in different data formats. Expediently, the processing device 10 is configured to provide the first control unit 5 with processing data defining the processing position 33 in a first data format and to provide the second control unit 6 with the processing data in a second data format. The second data format is expediently different from the first data format. For example, the first data format is a G code data format and the second data format is a vector data format, especially SVG.

For example, the first control unit 5 is configured to provide the second control unit 6 with the processing data in the second data format and/or the second control unit 6 is configured to provide the processing data of the first control unit 5 in the first data format. For example, one or both of the control units 5, 6 may be adapted to create and/or receive the processing data in one of the data formats, to create, receive and/or convert the processing data in the other of the data formats and/or to provide the processing data in the other data format to the other control unit 5, 6.

For example, the processing device 10, in particular the processing head 4, may have an input device enabling a user to manually enter processing data, for example in the form of one or more processing positions, into the second control unit 6. The processing data is then optionally converted by the second control unit 6 into the format required by the first control unit 5 and made available to the first control unit 5.

It is also possible that the first control unit 5 and the second control unit 6 have processing data with different data content. For example, the first control unit 5 may have less accurate processing data than the second control unit 6. In particular, the first control unit 5 can be configured to control the first positioning device 1 on the basis of processing data which has a lower spatial resolution than the processing data with which the second control unit 6 controls the second positioning device 2.

It is further possible that the control units 5, 6 accept/require the processing data in the same data format and/or with the same data content.

If two control units 5, 6 are present, each of which controls one of the positioning devices 1, 2, preferably a positional alignment between the two control units 5, 6 is carried out.

Expediently, the processing device 10 is configured to provide position information to the first control unit 5 and/or the second control unit 6 in order to perform a position calibration between the first control unit 5 and the second control unit 6. Expediently, one or both of the control units 5, 6 are adapted to generate the position information and to provide it to the other control unit 5, 6. In particular, the position information can indicate that one of the positioning devices 1, 2 is in a certain position, for example that the processing head 4 and/or the processing unit 3 are located at a zero position and/or a border of one or both of the positioning areas.

As an alternative and/or in addition to the position alignment, a time alignment, for example for the purpose of time synchronization, can also be performed between the two control units 5, 6. Preferably the processing device 10 is designed to provide the first control unit 5 and/or the second control unit 6 with time information in order to carry out a time alignment between the first control unit 5 and the second control unit 6. Expediently, one or both of the control units 5, 6 are configured to generate the time information and to provide it to the other control unit 5, 6.

The invention claimed is:

1. A processing device comprising:
a first positioning device and a processing head,
the processing head comprising a processing unit designed as at least a tool or applicator unit, and a second positioning device,
wherein the processing device is configured to selectively be operated in either a first state or a second state,
wherein, in the first state, the first positioning device is configured to move the processing head in order to position the processing unit with a first accuracy at a specified processing position,
wherein the processing device is configured to position, in the first state, the processing unit at the specified processing position with a second accuracy using the second positioning device, the second accuracy being higher than the first accuracy, so that the lower accuracy of the first positioning device is compensated for by the positioning with the second positioning device,
wherein the processing head is removable from the first positioning device in the second state, and the processing head is configured as a hand-guided processing device, so that, in the second state, the processing head is manually positionable at the specified processing position, and the processing head is configured to position, in the second state, the processing unit with the second accuracy at the specified processing position using the second positioning device, so that a lower accuracy of the manual positioning is compensated for by the positioning with the second positioning device.

2. The processing device according to claim 1, wherein the processing device has a first control unit for controlling the first positioning device and a second control unit for controlling the second positioning device.

3. The processing device according to claim 2, wherein the processing device is configured to provide the first control unit with processing data defining the processing position in a first data format and to provide the second control unit with the processing data in a second data format.

4. The processing device according to claim 2, wherein the processing device is configured to provide position information to the first control unit or the second control unit in order to perform a position calibration between the first control unit and the second control unit.

5. The processing device according to claim 2, wherein the processing device is configured to provide the first control unit or the second control unit with time information in order to carry out a time alignment between the first control unit and the second control unit.

6. The processing device according to claim 2, wherein the first positioning device comprises a robot device, an industrial robot, a gantry robot, a SCARA robot, an articulated arm robot, a robot with linear axes, a rail vehicle, an apparatus travelling on a workpiece, or a traction system with ropes or chains.

7. The processing device according to claim 2, wherein the tool comprises a router, a saw, a laser, a punching device, a cutting tool, or a water jet or the applicator unit comprises a printing unit.

8. The processing device according to claim 2, wherein the processing device has a mechanical interface to which the processing head or the processing unit is detachably attached.

9. The processing device according to claim 2, wherein the processing device has a lifting means for handling the processing head, the processing unit or a workpiece.

10. The processing device according to claim 2, wherein the processing device has a changing magazine for receiving at least one further processing head or at least one further processing unit.

11. The processing device according to claim 2, wherein the first control unit and the second control unit are respective microcontrollers.

12. The processing device according to claim 2, wherein the second control unit is arranged in the processing head and the first control unit is arranged outside of the processing head.

13. The processing device according to claim 1, wherein the processing device is configured to carry out the positioning with the first positioning device within an open-loop control and to carry out the positioning with the second positioning device within a closed-loop control.

14. The processing device according to claim 1, wherein the first positioning device has a first degree of freedom or a second degree of freedom for positioning the processing unit, and the processing device is adapted to compensate, using the second positioning device, for the lower accuracy of the first positioning device in the first degree of freedom or the second degree of freedom.

15. The processing device according to claim 1, wherein the processing device is adapted to determine the position of the processing unit relative to the specified processing position and to perform the positioning of the processing unit using the first positioning device or the second positioning device based on the determined position of the processing unit.

16. The processing device according to claim 15, wherein the processing device has a sensor unit for detecting a reference element present on the processing device or a workpiece, and is configured to determine the position of the processing unit relative to the specified processing position using the sensor unit.

17. The processing device according to claim 16, wherein the sensor is arranged on the processing head.

* * * * *